(12) United States Patent
Thorwirth et al.

(10) Patent No.: US 7,602,548 B2
(45) Date of Patent: Oct. 13, 2009

(54) SCHIEFSPIEGLER TELESCOPE WITH THREE REFLECTING SURFACES

(75) Inventors: Guenter Thorwirth, Laasdorf (DE); Burkart Voss, Dorndorf-Steudnitz (DE)

(73) Assignee: Jena-Optronik GmbH, Jena (DE)

( * ) Notice: Subject to any disclaimer, the term of this patent is extended or adjusted under 35 U.S.C. 154(b) by 394 days.

(21) Appl. No.: 11/531,751

(22) Filed: Sep. 14, 2006

(65) Prior Publication Data
US 2007/0058245 A1 Mar. 15, 2007

(30) Foreign Application Priority Data
Sep. 14, 2005 (DE) .................. 10 2005 044 910

(51) Int. Cl.
*G02B 23/00* (2006.01)
(52) U.S. Cl. .................. 359/366; 359/399; 359/856
(58) Field of Classification Search .................. None
See application file for complete search history.

(56) References Cited
U.S. PATENT DOCUMENTS

| | | | |
|---|---|---|---|
| 3,748,015 A | | 7/1973 | Offner |
| 3,781,552 A | * | 12/1973 | Kadrmas .............. 250/214 DC |
| 4,097,125 A | | 6/1978 | Suzuki |
| 4,733,955 A | | 3/1988 | Cook |
| 7,319,556 B1 | * | 1/2008 | Ackermann et al. ......... 359/366 |

FOREIGN PATENT DOCUMENTS

| | | |
|---|---|---|
| DE | 196 49 841 | 3/2001 |
| DE | 102 45 559 | 4/2004 |
| EP | 0 019 447 | 11/1980 |
| EP | 0 656 552 | 6/1995 |
| GB | 2 332 533 | 6/1999 |
| WO | WO 02/50597 | 6/2002 |
| WO | 03/002485 | 1/2003 |

* cited by examiner

*Primary Examiner*—Stephone B Allen
*Assistant Examiner*—Derek S Chapel
(74) *Attorney, Agent, or Firm*—Reed Smith LLP

(57) ABSTRACT

A Schiefspiegler telescope with three reflecting surfaces, preferably for observing the earth from space, particularly for imaging radiometers. A novel possibility for realizing a reflector telescope without vignetting which permits a simple construction and a simple adjustment of the reflecting surfaces relative to one another. In a Schiefspiegler telescope with three reflecting surfaces whose mirror axes are arranged within a plane, the primary reflecting surface and tertiary reflecting surface are convex surfaces of identical shape arranged symmetrically with respect to an axis of symmetry. The secondary reflecting surface is arranged symmetric to the primary reflecting surface and tertiary reflecting surface so as to be rotationally symmetric around the axis of symmetry so that all three reflecting surfaces have an axially symmetric mirror arrangement with respect to design in which the optical imaging is transmitted to a receiver in the manner of an off-axis telescope.

16 Claims, 4 Drawing Sheets

SCHIEFSPIEGLER TELESCOPE WITH THREE REFLECTING SURFACES

CROSS-REFERENCE TO RELATED APPLICATION

This application claims priority of German Application No. 10 2005 044 910.7, filed Sep. 14, 2005, the complete disclosure of which is hereby incorporated by reference.

BACKGROUND OF THE INVENTION a) Field of the Invention

The invention is directed to a Schiefspiegler telescope with three reflecting surfaces in which an optical imaging by means of the three reflecting surfaces takes place extra-axially with respect to their respective center mirror axis, wherein the mirror axes of all of the reflecting surfaces are arranged within a plane. The invention is applied for observing the earth from space, particularly for imaging radiometers.

b) Description of the Related Art

Reflector telescopes of conventional construction in a rotationally symmetric mirror configuration (e.g., the systems of Gregory, Cassegrain and Newton) which are standard above all for astronomical observation suffer from contrast-reducing central vignetting due to the secondary mirror located in the beam path and the holding braces which are usually provided for it.

Reflector telescopes without vignetting, also called Schiefspieglers, generally comprise two to four mirrors arranged at various inclinations and constructed in different forms (concave, convex, partially parabolic to hyperparabolic, and so on). The correction of image errors allows only low light intensities, particularly in double-reflectors, or other costly corrective measures are required (e.g., corrective lens or toroidally deformed reflecting surface, and so on).

Triple-Schiefspieglers go back to the anastigmatic double-reflectors by A. Kutter, who selected a concave primary mirror and a convex secondary mirror because imaging errors such as coma, astigmatism and spherical aberration have opposite signs and therefore partially compensate one another. Chromatic aberrations are eliminated by omitting refractive surfaces. According to Kutter, vignetting is prevented because only the beam path which is free from silhouetting guarantees imaging with the highest possible contrast and resolving capacity.

In order to achieve improved optical imaging characteristics, the quantity of optically active surfaces, that is, the quantity of mirrors, is increased in reflector telescopes.

To enable a compact construction in spite of this, DE 196 49 841 C2 describes a compact Schiefspiegler in which the optical surfaces are used repeatedly. However, asymmetric mirror systems which are tilted parallel to a plane are used, and the problem of increased expenditure on adjustment remains unsolved.

Further, WO 03/02485 A2 discloses a scanning sensor system with rotating telescope components in which two telescope parts are moved at different rotational speeds. The problem of adjusting the mirrors relative to one another is also noted in this reference.

Another Schiefspiegler is known from EP 0 019 447 A1 which describes an anastigmatically imaging three-mirror optics system comprising a primary mirror with an ellipsoidal surface, a secondary mirror with a hyperboloid surface, and a tertiary mirror with another ellipsoidal surface. All three mirrors are in a plane, but are arranged off-center and at an inclination relative to an optical axis determined therein and form an off-axis system with respect to the aperture and field imaging. While the adjustments of the mirrors and angular settings within a plane are limited, the overall arrangement is still costly as concerns minimizing imaging errors.

OBJECT AND SUMMARY OF THE INVENTION

It is the primary object of the invention to find a novel possibility for realizing a reflector telescope without vignetting (Schiefspiegler) which permits a simple construction and a simple adjustment of the reflecting surfaces relative to one another. A further object is to enable repeatedly rotating scanning (imaging).

In a Schiefspiegler telescope with three reflecting surfaces in which an optical imaging by means of the three reflecting surfaces is provided in a off-axis manner with reference to a respective middle mirror axis, wherein all mirror axes of the reflecting surfaces are arranged within a plane, the above-stated object is met according to the invention in that the primary reflecting surface and tertiary reflecting surface are convex surfaces of identical shape which are arranged symmetrically with respect to an axis of symmetry, and in that the secondary reflecting surface is arranged symmetric to the primary reflecting surface and tertiary reflecting surface and so as to be rotationally symmetric around the axis of symmetry so that all three reflecting surfaces have an axially symmetric on-axis mirror arrangement with respect to design in which the optical imaging is transmitted to a receiver in the manner of an off-axis telescope.

The primary reflecting surface and the tertiary reflecting surface are advantageously arranged on a common surface which is rotationally symmetric around the axis of symmetry. The reflecting surfaces themselves are advisably aspheric and are preferably higher-order aspheres.

In a preferred construction, the axially symmetric mirror arrangement is provided for at least two off-axis beam bundles for imaging on different receivers, wherein the beam bundles extend along planes which are fixed in a direction through the axis of symmetry of the mirror arrangement, wherein the planes of the beam bundles intersect the axis of symmetry of the mirror arrangement when more than two off-axis beam bundles are used.

In particular applications, it is advisable that two off-axis beam bundles are arranged along one and the same plane, and large-area input deflecting mirrors are provided for receiving input beam bundles which are parallel to one another. To separate the opposed off-axis beam bundles, there is advisably central vignetting inside the surface of the input deflecting mirror.

In a first advisable construction, the central vignetting is formed as an opening for passing the imaging beam bundle to the receiver. The receiver can be directly illuminated or an output deflecting mirror can be arranged behind the opening of the input deflecting mirror in order to image the imaging beam bundle on the receiver.

In a second useful variant, the central vignetting is formed as a fitted output deflecting mirror for reflecting the imaging beam path on the receiver, and the output deflecting mirror is preferably fitted to the input deflecting mirror in a wedge-shaped manner.

In another construction, beamsplitters are advisably used for separating the opposed off-axis beam bundles. Dichroic beamsplitters are preferably used for this purpose.

In the light path of the input beam bundle to the off-axis beam bundle, at least one depolarizer is advantageously arranged in front of the input deflecting mirror in order to reduce the polarization sensitivity within the telescopic imaging. This is particularly important when scenes to be imaged reflect partially or primarily polarized light (e.g., water surfaces or glass surfaces, etc.).

In order to implement a rotating scanning system, the on-axis mirror arrangement is advantageously constructed in such a way that it is rotatable around an axis of rotation orthogonal to the axis of symmetry. The input deflecting mirror and the output deflecting mirror are rigidly coupled with the mirror arrangement, and an additional plane mirror (half-angle mirror) is rotated around this same axis of rotation at half of the rotating speed in order to direct the off-axis beam bundle to a stationary receiver. This rotating scanning system is preferably operated with two opposed off-axis beam bundles.

The invention is based on the consideration that Schiefspiegler telescopes are costly to adjust and are exposed to the risk of subsequent disadjustment by environmental influences. A symmetric mirror arrangement would be desirable for simplification. The desire for a symmetric construction and error-free optical imaging of a scene by means of an adjustable two-mirror, rotationally symmetric on-axis telescope which is operated optically as a three-reflector Schiefspiegler are bridged in a surprisingly compact manner in that the primary mirror and the tertiary mirror are portions of one and the same mirror base surface (carrier surface). This is advantageous for the manufacture as well as for the adjustment of the telescope. Equivalent optical images can be realized in different (preferably, but not necessarily, opposed) directions through the axis of symmetry. Oppositely extending off-axis beam bundles within a plane are particularly suitable for enabling a simple rotating scanning system.

With the solution according to the invention it is possible to implement a reflector telescope without vignetting (Schiefspiegler) which permits a simple construction and a simple adjustment of the reflecting surfaces relative to one another. Further, a rotating scanning (imaging) enabling application in radiometers can be realized in an uncomplicated manner.

The invention will be described more fully in the following with reference to embodiment examples.

DESCRIPTION OF THE PREFERRED EMBODIMENTS

Figure 1:
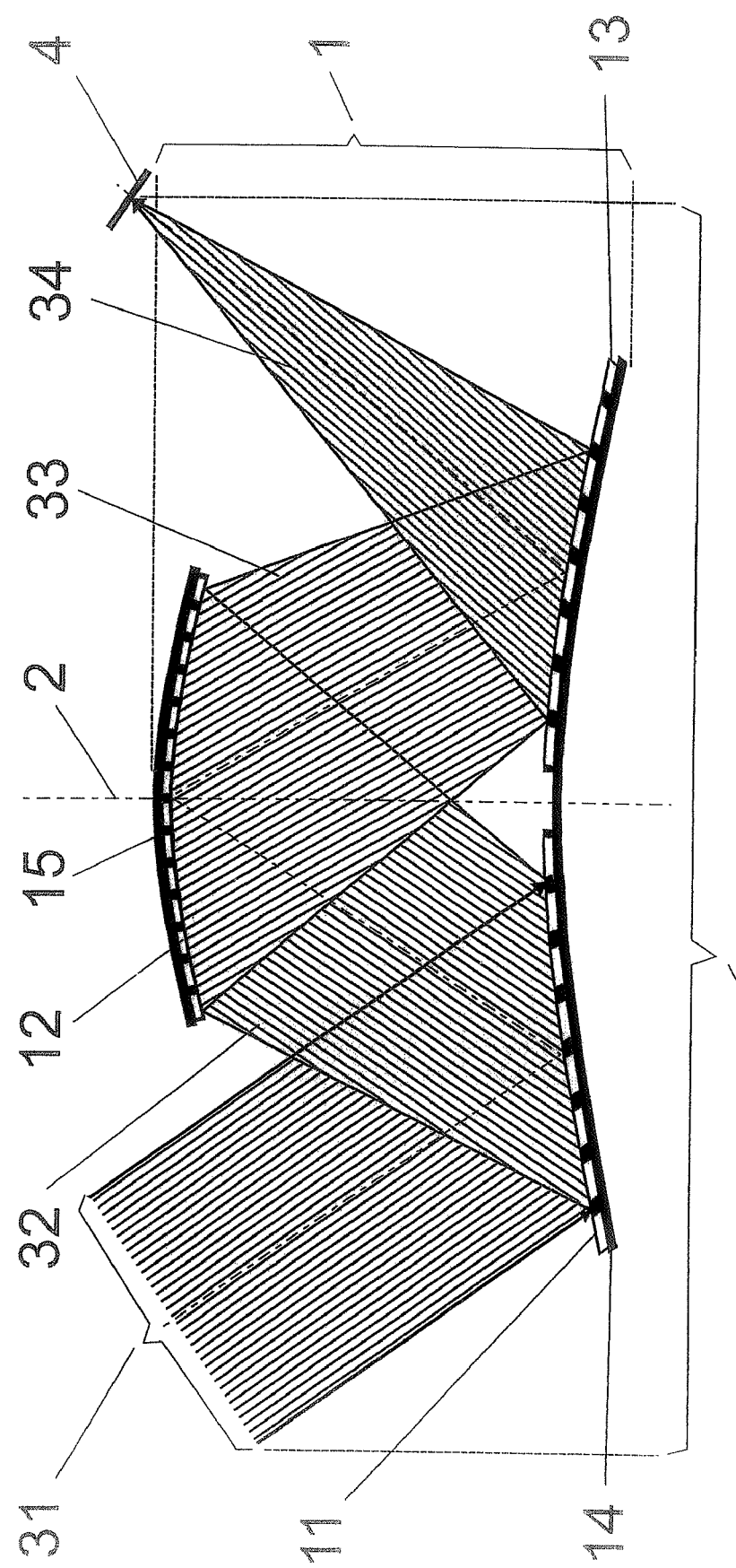
FIG. 1 shows a schematic view of the Schiefspiegler telescope arrangement according to the invention.

As is shown in FIG. 1, the Schiefspiegler telescope according to the invention substantially comprises a mirror arrangement 1 which has an axis of symmetry 2 and in which an off-axis beam bundle 3 extends from an input beam bundle 31 along a plane (in this instance, the drawing plane) through the axis of symmetry 2 for imaging on a receiver 4. The off-axis beam bundle 3 uses three reflecting surfaces, a primary reflecting surface 11, a secondary reflecting surface 12, and a tertiary reflecting surface 13. The primary reflecting surface 11 and tertiary reflecting surface 13 lie on the same carrier surface 14 of the mirror arrangement 1 symmetric to the axis of symmetry 2.

Therefore, the mirror arrangement 1 comprises aspheres which are curved in the same direction along the axis of symmetry 2. The larger carrier surface 14 carries the convex primary reflecting surface 11 and the tertiary reflecting surface 13. The smaller carrier surface 15 located above the latter has the secondary reflecting surface 12 at its concave side facing the carrier surface 14.

The input beam bundle 31 impinges laterally past the secondary reflecting surface 12 arranged around the axis of symmetry 2 on an area of the carrier surface 14 presenting the primary reflecting surface 11 at an angle to the axis of symmetry 2 such that the bundle 32 reflected by the primary reflecting surface 11 strikes the concave secondary reflecting surface 12 over a large surface and symmetrically with oblique incidence. The bundle 33 reflected at the secondary mirror 12 then strikes the carrier surface 14 anew in a mirror-symmetrically opposite area with respect to the axis of symmetry 2 of the primary reflecting surface 11 and which presents a tertiary reflecting surface 13 for reflection of a bundle 34 on the receiver 4. The primary reflecting surface 11 and tertiary reflecting surface 13 are constructed through manufacturing technique as unitary, preferably aspheric reflecting surfaces on the rotationally-symmetrically shaped carrier surface 14 which, together with the secondary mirror 12, represent a rotationally symmetric mirror arrangement 1.

Figure 2:
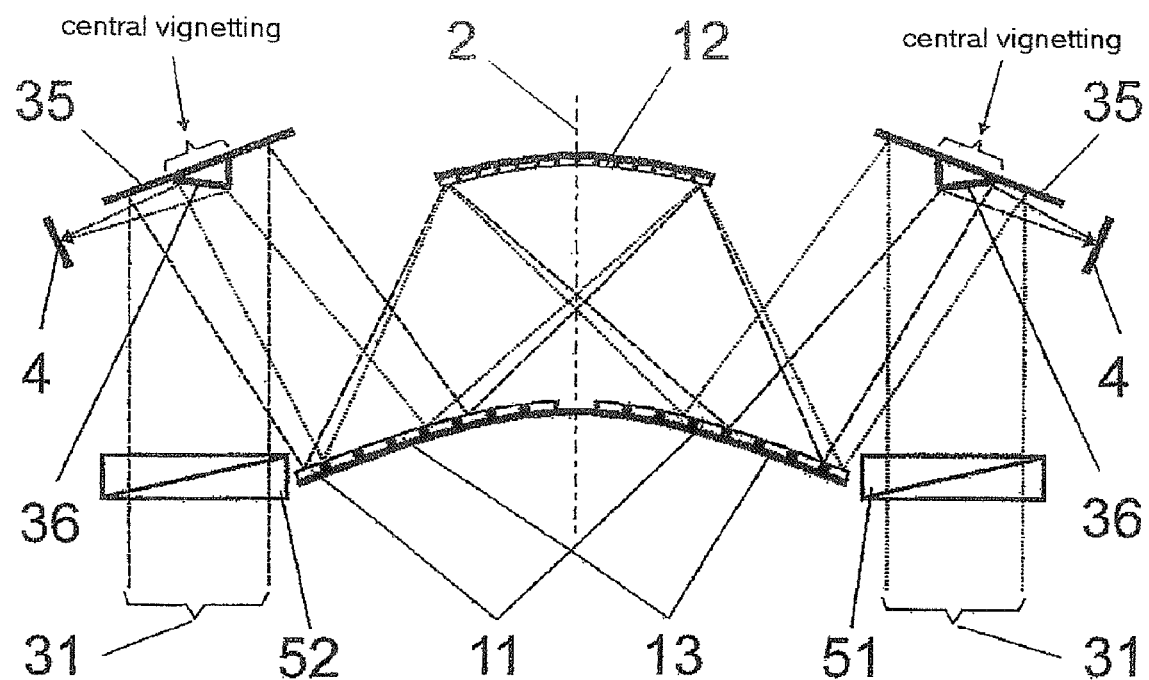
FIG. 2 shows a variant with two opposed off-axis beam bundles and deflecting mirrors which couple in parallel input beam bundles obliquely on the mirror arrangement and have a fitted output deflecting mirror to the receiver.

In a preferred design variant of the invention according to FIG. 2, the rotational symmetry of the mirror arrangement 1 around its axis of symmetry 2 is made use of in order to use the mirror arrangement 1 in at least two directions. This can be advantageous, e.g., when optical elements, e.g., depolarizers 51 and 52, which must be placed in the input beam bundle 31 in order to reduce polarization effects within the input beam bundle 31 have only limited spectral transmission windows or receivers 4 with different spectral sensitivity in order to be able to record the largest possible spectral region of the imaged scene.

In order to image two input beam bundles 31 (e.g., with different spectral characteristics) with one and the same mirror arrangement 1 as an off-axis beam bundle 3, two input deflecting mirrors 35 are used to deflect parallel input beam bundles 31 (in the same direction) in such a way that they impinge on defined primary reflecting surfaces 11 of the carrier surface 14 at the required oblique angle of incidence (with respect to the axis of symmetry 2).

In a first construction, as is shown in FIG. 2, two off-axis beam bundles 3 are oppositely coupled into a plane (the drawing plane in this instance) on the mirror arrangement 1 because, as was explained above, two different wavelength regions are to be received in order to achieve a broadband spectral band width (e.g., from 450 nm to 14 μm) of the optical imaging. In so doing, for example, a wavelength region from 0.45 to 7 μm is transmitted in an input beam bundle 31 through a depolarizer 51 of magnesium fluoride (MgF$_2$) and a wavelength region from 7 to 14 μm is transmitted in the other input beam bundle 31 through a depolarizer 52 of cadmium selenide (CdSe). In order to separate the different beam bundles 3, a central vignetting, which is caused in this instance by a small fitted output deflecting mirror 36, must be effected in the surface of the input deflecting mirror 35 so that the beam bundle 3 running through the mirror arrangement 1 can be coupled out onto the receiver 4.

To prevent vignetting or if more than two wavelength regions are to be scanned in order to obtain broadband imaging, it is possible in the preceding examples and all following examples to position the plurality of off-axis beam bundles 3 at defined angles around the axis of symmetry 2 in such a way that they intersect only in the axis of symmetry 2.

Figure 3:
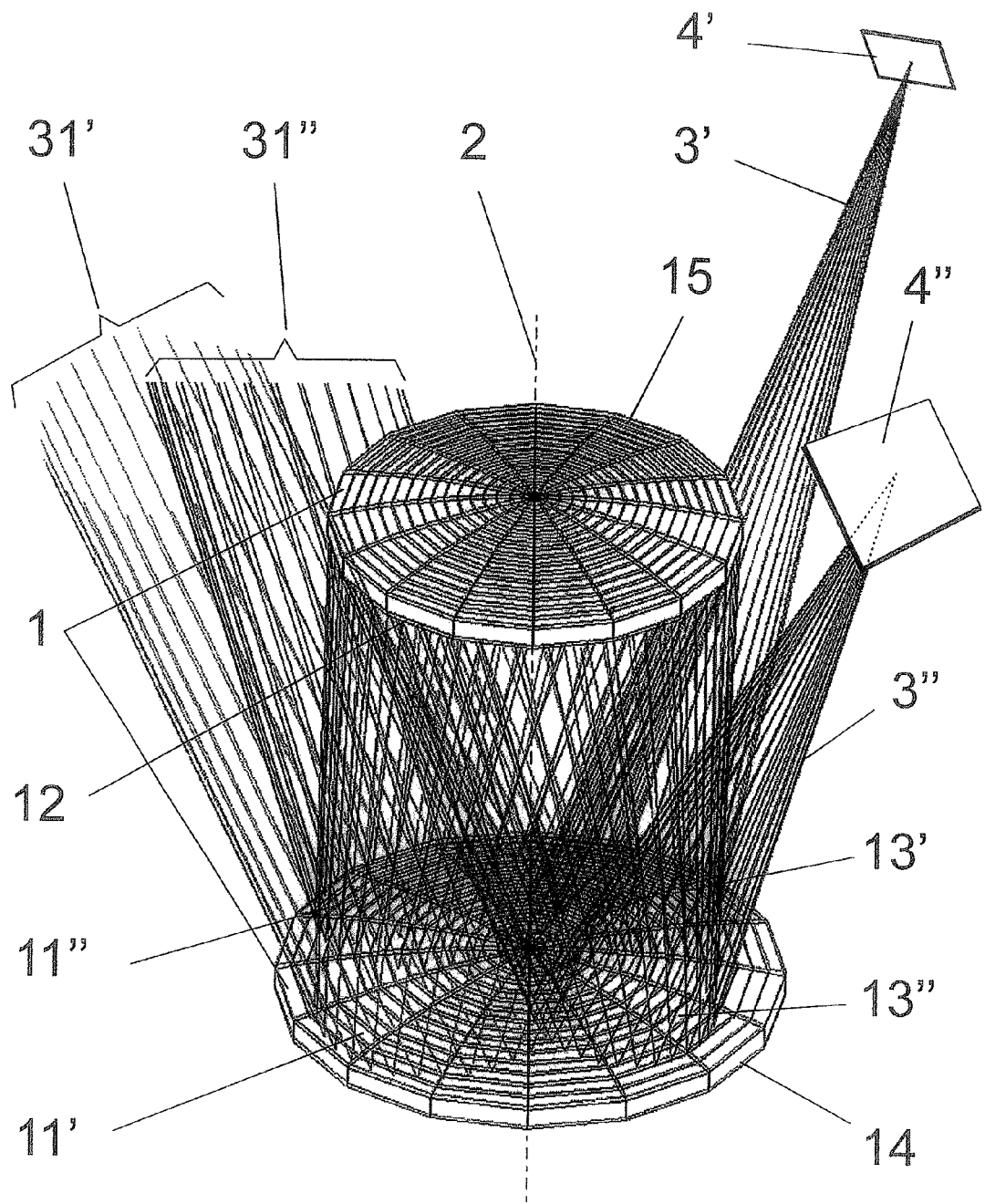
FIG. 3 shows a construction of the basic principle according to FIG. 1 in which a plurality of off-axis beam bundles impinge obliquely on the mirror arrangement as parallel input beam bundles at different angles around the axis of symmetry.

A second configuration of this kind for multiple use of the mirror arrangement 1 is shown in FIG. 3 for input beam bundles 31', 31", etc. which are imaged, respectively, on a corresponding quantity of receivers 4', 4", etc. variously distributed around the axis of symmetry 2 at primary reflecting surfaces 11', 11", etc. in different locations by means of the common secondary reflecting surface 12 and tertiary reflecting surfaces 13', 13", etc. in different locations which lie symmetric to the associated primary reflecting surface 11', 11", etc. with respect to the axis of symmetry 2. The individual off-axis beam bundles 3', 3", etc. extend in each instance along a plane. The planes of all beam bundles 3', 3", etc. intersect in the axis of symmetry 2. The differently defined primary reflecting surfaces 11', 11", etc. and tertiary reflecting surfaces 13', 13", etc. can be partially overlapping mirror areas or completely separate reflecting surfaces on the common carrier surface 14. For the sake of clarity, the input deflecting mirror 35 and depolarizer 51 and 52 are not shown in FIG. 3, although they are actually unconditionally required for realizing (polarization-reducing) broadband images of one and the same scene.

Figure 4:
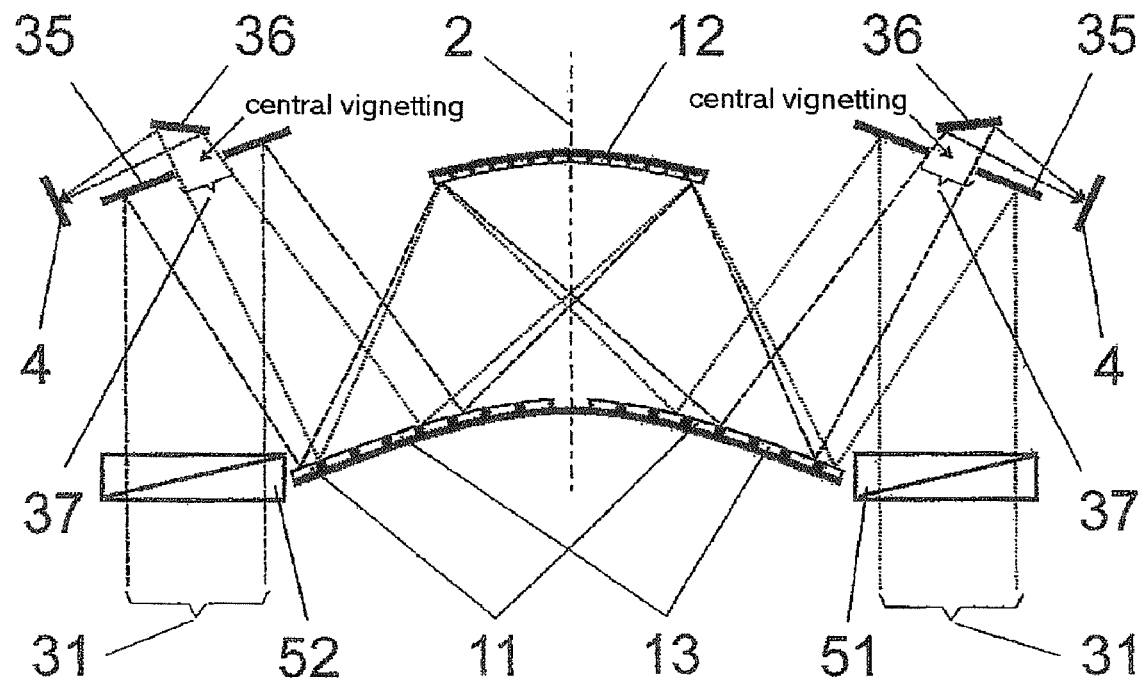
FIG. 4 shows a variant that is modified from FIG. 2 with an opening in the input deflecting mirror for coupling out on the output deflecting mirror to the receiver.

In another construction with two off-axis beam bundles 3 extending within a plane, as is shown in FIG. 4, the vignetting is effected in the center of the input deflecting mirror 35 through an opening 37 through which the bundle 34 reflected by the tertiary reflecting surface 13 strikes the output deflecting mirror 36 arranged behind the input deflecting mirror 35 and is reflected from there onto the receiver 4. This beam shape is exactly mirror-symmetrical for two off-axis beam bundles 3 entering in opposite directions.

Figure 5:
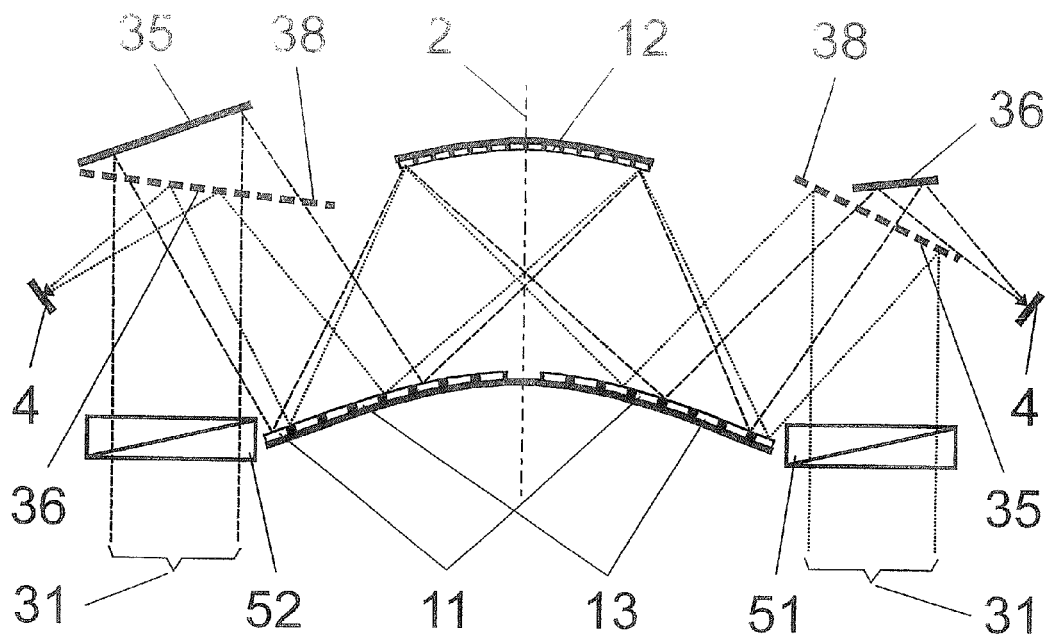
FIG. 5 shows another design that has been modified from FIG. 2 in which dichroic beamsplitters are used for separating the opposed off-axis beam bundles.
Figure 6:
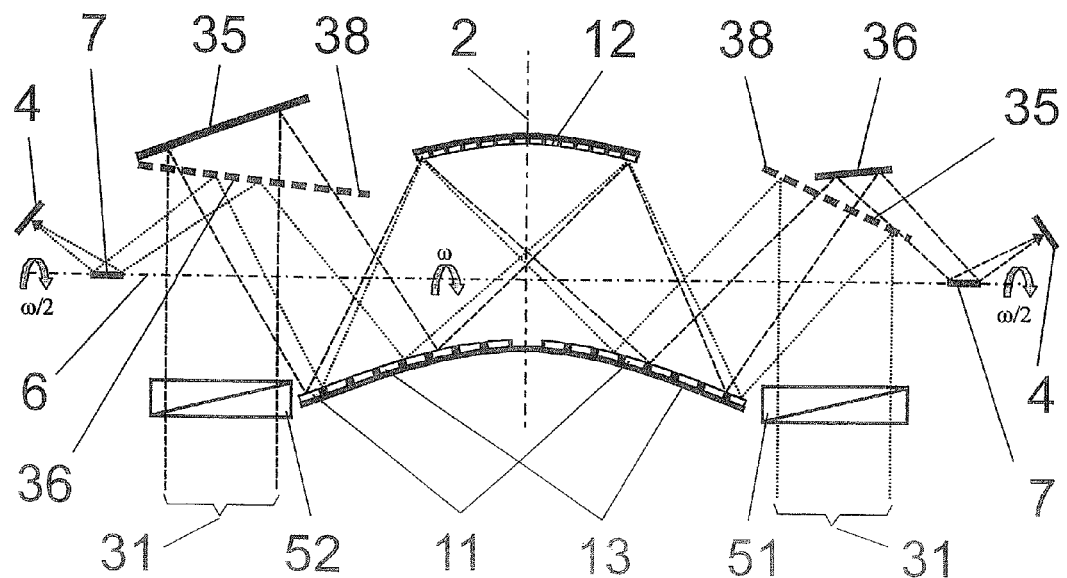
FIG. 6 shows an application of the invention as a rotating radiometer using the construction of FIG. 5 with rotation of the mirror arrangement around an axis of rotation orthogonal to the axis of symmetry and imaging on stationary receivers by means of half-angle mirrors.

In a third constructional variant, two oppositely extending off-axis beam bundles 3 are coupled in and separated by beamsplitters and full reflectors as is shown in FIG. 5. This assumes that the wavelength regions which are passed by the depolarizers 51 and 52 in the input beam bundles 31 do not intersect and that there is a dichroic beamsplitter 38 which separates the two wavelength regions sufficiently sharply.

For the right-hand input beam bundle 31 in which the depolarizer 51 is arranged, the dichroic beamsplitter 38 functions as an input deflecting mirror 35 when the dichroic beamsplitter 38 reflects the short-wavelength region passed by the depolarizer 51. The left-hand input beam bundle 31 entering through the depolarizer 52 initially strikes the dichroic beamsplitter 38, which is arranged as output deflecting mirror 36, passes through the latter because the long-wave spectral components passed by the depolarizer 52 are not reflected by the dichroic beamsplitter 38, and is accordingly deflected to the primary reflecting surface 11 by the input deflecting mirror 35 (oriented as in the preceding examples) which is a full reflector, and transmitted through the mirror arrangement 1 as an off-axis beam bundle 3 as described above.

When two different dichroic beamsplitters 38 are found which have virtually opposite transmission characteristics and reflection characteristics, either the arrangement shown for the left-hand input beam bundle 31 (with the dichroic output deflecting mirror 36 and normal input deflecting mirror 35) can be used in a mirror symmetric manner in the right-hand input beam bundle 31 impinging through the depolarizer 51 or the mirror arrangement shown for the right-hand input beam bundle 31 can be used exactly as used in the left-hand input beam bundle 31.

In a special constructional variant, one of the above-described variants of the multi-channel rotationally symmetric mirror arrangement 1, preferably the design according to FIG. 5, is formed as a revolving radiometer with Schiefspiegler telescope.

For this purpose, the mirror arrangement 1 with the associated components, input deflecting mirror 35 and output deflecting mirror 36, and possibly depolarizers 51 and 52 which are rigidly connected to the mirror arrangement 1 rotates around an axis of rotation 6 at an angular velocity ω to achieve revolving scanning in space. After the off-axis beam bundles 3, as described, e.g., with reference to FIG. 2, have passed through the mirror arrangement 1, the respective output deflecting mirror 36 is used in this example to direct the bundle 34 reflected by the tertiary reflecting surface 13 to a plane mirror, a half-angle mirror 7, as it is called, which is arranged on the axis of rotation 6 and rotates at one half of the angular velocity ω/2 in order to compensate for the image rotation and accordingly to transmit the optical imaging to a stationary receiver 4.

With a continuous revolving movement of the robust Schiefspiegler telescope around the axis of rotation 6, particularly for scanning a planet surface from space, systematic line scans are made possible in that the optical imaging of a scene (e.g., the surface of the earth) is carried out through a free scanning window of approximately 60°, and calibrations of the scanning system are carried out regularly in the remaining part of a revolution around the axis of rotation 6.

While the foregoing description and drawings represent the present invention, it will be obvious to those skilled in the art that various changes may be made therein without departing from the true spirit and scope of the present invention.

REFERENCE NUMBERS 1 (axially symmetric) mirror arrangement
11 primary reflecting surface
11', 11", . . . primary reflecting surfaces
12 secondary reflecting surface
13 tertiary reflecting surface
13', 13", . . . tertiary reflecting surfaces
14 carrier surface (for primary reflecting surface and tertiary reflecting surface)
15 carrier surface (of the secondary mirror)
2 axis of symmetry
3 off-axis beam bundle
3', 3", . . . off-axis beam bundles
31 input beam bundle
31', 31", . . . input beam bundles
32 bundle reflected by the primary mirror
33 bundle reflected by the secondary mirror
34 bundle reflected by the tertiary mirror
35 input deflecting mirror
36 output deflecting mirror
37 opening
38 dichroic beamsplitter
4 receiver 4', 4", ... receivers
51, 52 depolarizers (with different transmission ranges)
6 axis of rotation
7 plane mirror (half-angle mirror)
ω angular velocity

What is claimed is:

1. A Schiefspiegler telescope comprising:
three reflecting surfaces being primary, secondary and tertiary and being provided for an optical imaging by successive reflection at said three reflecting surfaces extra-axially with respect to a center mirror axis of each of said reflecting surfaces;
said center mirror axes of all of the reflecting surfaces being arranged within a sole plane;
said primary reflecting surface and tertiary reflecting surface are convex surfaces of identical shape which are arranged symmetrically with respect to an axis of symmetry; and
said secondary reflecting surface being arranged symmetric to the primary reflecting surface and the tertiary reflecting surface and so as to be rotationally symmetric around said axis of symmetry so that all three reflecting surfaces represent an axially symmetric mirror arrangement with respect to design in which the optical imaging is transmitted to a receiver in a manner of oblique off-axis reflections over said primary, secondary, and tertiary reflecting surfaces.

2. The arrangement according to claim 1, wherein the primary reflecting surface and the tertiary reflecting surface are arranged on a common carrier surface which is rotationally symmetric around the axis of symmetry.

3. The arrangement according to claim 1, wherein the reflecting surfaces are aspheric.

4. The arrangement according to claim 3, wherein the reflecting surfaces are higher-order aspheres.

5. The arrangement according to claim 1, wherein the axially symmetric mirror arrangement is provided for at least two off-axis beam bundles for imaging on different receivers, wherein the beam bundles extend along planes which are fixed in a direction through the axis of symmetry.

6. The arrangement according to claim 5, wherein the planes of the beam bundles intersect in the axis of symmetry of the mirror arrangement when using more than two off-axis beam bundles.

7. The arrangement according to claim 5, wherein two off-axis beam bundles are arranged in opposite directions along one and the same plane, and large-area input deflecting mirrors are provided for receiving input beam bundles which are parallel to one another.

8. The arrangement according to claim 7, wherein there is central vignetting inside the surface of the input deflecting mirror to separate the opposed off-axis beam bundles.

9. The arrangement according to claim 8, wherein the central vignetting is formed as an opening for passing the imaging beam bundle to the receiver.

10. The arrangement according to claim 9, wherein an output deflecting mirror is arranged behind the opening of the input deflecting mirror in order to image the off-axis beam bundle on the receiver.

11. The arrangement according to claim 8, wherein the central vignetting is formed as a fitted output deflecting mirror for reflecting the off-axis beam bundle on the receiver.

12. The arrangement according to claim 11, wherein the output deflecting mirror is fitted to the input deflecting mirror in a wedge-shaped manner.

13. The arrangement according to claim 7, wherein depolarizers are provided in the input beam bundles to suppress polarization phenomena in the input beam bundle.

14. The arrangement according to claim 7, wherein beamsplitters are provided for separating the opposed off-axis beam bundles.

15. The arrangement according to claim 14, wherein dichroic beamsplitters are provided for separating the beam bundles.

16. The arrangement according to claim 7, wherein the axially symmetrical mirror arrangement is rotatable around an axis of rotation orthogonal to the axis of symmetry to realize a rotating scanning system, wherein the input deflecting mirror and the output deflecting mirror are rigidly coupled with the mirror arrangement and rotate at a defined rotational speed (ω), and an additional half-angle mirror is arranged on the same axis of rotation, which half-angle mirror is rotated at half of the rotational speed (ω/2) relative to the rotational speed (ω) of the mirror arrangement for optical imaging of the two off-axis beam bundles on stationary receivers.

* * * * *